(12) United States Patent
Jacques et al.

(10) Patent No.: US 8,583,378 B2
(45) Date of Patent: Nov. 12, 2013

(54) METHOD OF ESTIMATING PHYSICAL PARAMETERS OF A GEOLOGICAL FORMATION

(75) Inventors: Antoine Jacques, Pau (FR); Jean-Luc Boutaud De La Combe, Pau (FR); Pierre Berest, Palaiseau Cedex (FR); Benoit Brouard, Paris (FR)

(73) Assignee: Total SA, Courbevoie (FR)

( * ) Notice: Subject to any disclaimer, the term of this patent is extended or adjusted under 35 U.S.C. 154(b) by 590 days.

(21) Appl. No.: 12/466,460

(22) Filed: May 15, 2009

(65) Prior Publication Data

US 2010/0121580 A1    May 13, 2010

(30) Foreign Application Priority Data

May 16, 2008  (FR) ..................................... 08 53208

(51) Int. Cl.
    *G01N 15/08* (2006.01)
(52) U.S. Cl.
    USPC ........ 702/11; 702/6; 702/12; 702/45; 702/50; 702/100; 73/152.01; 73/152.02; 73/152.05; 73/152.39; 73/152.41; 166/250.02; 166/250.03; 703/10

(58) Field of Classification Search
    USPC ......... 702/6, 11, 12, 16, 45, 50, 98, 100, 138, 702/166; 703/10; 73/152.01, 152.02, 73/152.05, 152.39, 152.41; 166/250.02, 166/250.03
    See application file for complete search history.

(56) References Cited

U.S. PATENT DOCUMENTS

| | | | |
|---|---|---|---|
| 2,972,050 A | 2/1961 | Allen | |
| 3,771,360 A | 11/1973 | Prats | |
| 4,624,130 A | 11/1986 | Faul et al. | |
| 4,720,995 A | 1/1988 | Thiel | |
| 5,269,180 A | 12/1993 | Dave et al. | |
| 5,519,322 A | 5/1996 | Pozzi et al. | |
| 5,857,530 A * | 1/1999 | Gronseth | ........................ 175/45 |
| 5,892,148 A | 4/1999 | Durup et al. | |
| 7,222,022 B2 | 5/2007 | Kneissl et al. | |
| 2003/0094040 A1* | 5/2003 | Proett et al. | ................. 73/152.05 |
| 2004/0111216 A1* | 6/2004 | Kneissl et al. | ................... 702/12 |
| 2008/0314142 A1* | 12/2008 | Davies | ............................ 73/295 |

FOREIGN PATENT DOCUMENTS

| | | |
|---|---|---|
| FR | 2576415 A1 | 7/1986 |
| FR | 2747470 A | 10/1997 |
| WO | 2007134747 A1 | 11/2007 |

OTHER PUBLICATIONS

Institute National de la Propriete Industrielle (INPI), Preliminary Search Report of FR0853208 dated Dec. 8, 2008.
Berest, P. et al., Tightness Tests in Salt-Cavern Wells, Oil & Gas Science and Technology, Rev. IFP, vol. 56 (2001), No. 5, pp. 451-469, France.

* cited by examiner

*Primary Examiner* — Alexander H Taningco
*Assistant Examiner* — Paul D Lee
(74) *Attorney, Agent, or Firm* — Patzik, Frank & Samotny Ltd.

(57) ABSTRACT

A well passing through a geological formation is fitted with a tube, open at its bottom end, that is filled with a fluid. Another fluid is in the annular space between the tube and the wall of the well, the two fluids exhibiting an interface situated in the annular space. A hydraulic balance of the fluids of the well is disturbed and the trend of certain quantities is measured. These measurements are moreover simulated by computer by using different sets of values for the physical parameters, and efforts are made to estimate the geological formation. A comparison of the measurements with the simulation results makes it possible to identify an optimum set of values for the parameters.

22 Claims, 4 Drawing Sheets

METHOD OF ESTIMATING PHYSICAL PARAMETERS OF A GEOLOGICAL FORMATION

FIELD OF THE INVENTION

The present invention relates to the determination of physical parameters of layers of materials in the subsoil.

BACKGROUND OF THE INVENTION

The object of the method is to find properties such as the permeability, the porosity or the natural pressure, of the layers of materials in the subsoil. The knowledge of such properties is notably useful if exploitation of the subsoil is envisaged, for example to extract hydrocarbons therefrom.

Document FR-A-2 747 470 describes a method of testing seal-tightness of a subterranean fluid storage cavity. According to this method, the cavity and a well that gives access to it from the surface are filled with two non-miscible fluids, the interface between the two fluids being positioned at a desired depth. To simulate a leak at this depth, predetermined quantities of one of the two fluids are injected or subtracted. The pressures at the well head are measured, together with the position of the interface before and after each injection or removal. The leak flow rate is then estimated from these measurements.

Such a method makes it possible to qualify the seal-tightness of the cavity by estimating a leak flow rate at the casing shoe of the well. This method does not make it possible to estimate the position of the leak, or estimate physical parameters of the materials surrounding the well at a given depth. Furthermore, this method does not make it possible to obtain physical parameters of several layers of materials in the well.

OBJECT AND SUMMARY OF THE INVENTION

The present invention aims to measure physical parameters of the subsoil by being less subject to such limitations.

According to the invention, there is proposed a method of estimating physical parameters of a geological formation, comprising the following steps:
  equipping a well passing through the geological formation with a tube open at its bottom end;
  filling the tube and a bottom part of an annular space situated around the tube in the well with a first fluid;
  filling the rest of the annular space with at least one second fluid so that the fluids exhibit an interface in the annular space;
  disturbing a hydraulic balance of the fluids in the well;
  measuring the trend of quantities relating to properties of the fluids in the well;
  performing computer simulations of the hydraulic behaviour of the fluids having a disturbed balance in the well, each simulation using a set of values for said physical parameters of the geological formation and giving rise to a simulated trend of said quantities; and
  comparing the measured and simulated trends of said quantities to identify an optimum set of values for the physical parameters of the geological formation.

The well and its environment are subjected to sequences during which measurements are taken and disturbances of the hydraulic balance are provoked, in conditions in which the fluids contained in the well are subjected to overpressures or depressures and because of this partly escape into the surrounding rocky layers. Quantities such as the pressure inside or outside the tube or the level of the interface between the fluids are measured in their dynamic trend.

The flow of the fluids towards the geological formation is moreover simulated using a model, for example an analytical model or finite element model, taking account of the properties of the materials of the subsoil, notably permeability and/or porosity. The comparison of the measurements to the predictions of the model makes it possible to estimate the parameters sought using optimization methods such as are commonly used in data analysis.

It is thus possible to arrive at estimations of physical parameters of the geological formation passed through by the well, because the trend that is measured and simulated relates to several sequences of successive measurements, the effects of which are accumulated in time.

In embodiments of the inventive method, it is possible, if necessary, to also use one and/or another of the following arrangements:
  the interface is successively positioned at different depths by adjusting the amount of the first and second fluids in the well, and, for each depth, the balance of the fluids is disturbed and the trend of the quantities is measured;
  the interface is displaced between at least two depths by adjusting the amount of the first and second fluids in the well, and, while the interface is being displaced, the balance of the fluids is disturbed and the trend of the quantities is measured;
  the trend of the quantities relating to properties of the fluids is measured during a displacement of the interface between at least two predetermined depths by adjusting the amount of the first and second fluids in the well;
  the hydraulic balance of the well is disturbed by injecting or subtracting a predetermined volume of fluid in the tube and/or in the annular space;
  each simulation comprises an estimation of the permeation flow rates of the fluids towards the geological formation, then an estimation of the simulated trend of the quantities relating to properties of the fluids in the well;
  each simulation also comprises an estimation of the depth of the interface in the annular space based on estimated permeation flow rates;
  the first and second fluids are liquids;
  the physical parameters comprise at least one parameter out of the permeability and the porosity of at least one layer of materials of the geological formation;
  the physical parameters comprise the natural pressure of at least one layer of materials of the geological formation;
  the first fluid is denser than the second fluid;
  the quantities relating to properties of the fluids in the well comprise the depth of the interface along the annular space;
  the quantities relating to properties of the fluids in the well comprise a flow rate of injection or removal of fluid at the well head;
  the well is also fitted with a servo-control for one of the quantities relating to fluid properties;
  the measurement sequences are executed in succession, each measurement sequence comprising:
    positioning the interface at a determined depth for the sequence by adjusting the amount of the first and second fluids in the well;
    disturbing a hydraulic balance of the fluids in the well by injecting or subtracting a predetermined volume of fluid in the tube and/or in the annular space;
  the quantities relating to properties of the fluids in the well comprise a pressure inside the tube, and a pressure in the annular space;

the pressures are measured at the well head;
one of the pressures is considered to be a reference pressure, and in which each measurement sequence comprises at least the following steps:
(a1) displacing the interface in the well to a predetermined position,
(a2) disturbing a balance of the fluids of the well by injecting a first volume of fluid, the reference pressure varying from an initial pressure value to a final pressure value,
(a3) observing the variations of the pressures, and
(a4) returning the fluids of the well to balance by subtracting a second volume of fluid, the reference pressure varying to roughly the initial pressure value;
in the step (a1), the interface is positioned at a depth that is different from one measurement sequence to another;
the geological formation comprises several layers passed through by the well, and, in the step (a1), the interface is positioned facing a different layer of materials from one measurement sequence to another.

Other features and benefits of the invention will become apparent from reading the following description of several of its embodiments, given by way of nonlimiting examples, in light of the appended drawings.

MORE DETAILED DESCRIPTION

Figure 1:
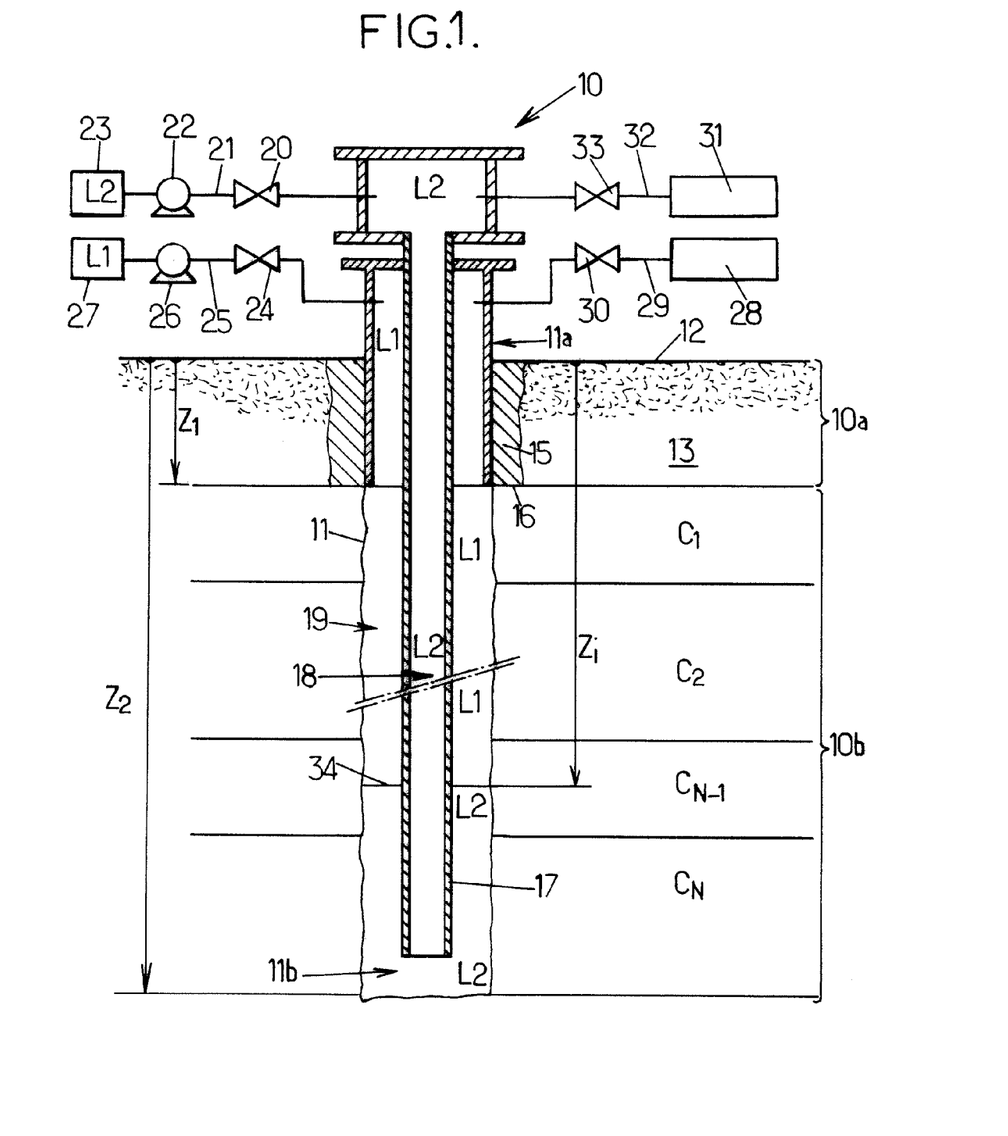
FIG. 1 is a cross-sectional view of a well in which the method of the inventive type is applied.

FIG. 1 shows a well 10 formed by a borehole 11 between a well head 11a close to the surface of the ground 12 and a well bottom 11b. The borehole 11 is shown in FIG. 1 as substantially vertical, but the latter can also be inclined, in the case of deflected wells.

A cemented casing 15 comprising an internal metal tube forms the internal lining of a top part 10a of the well 10, between the well head 11a and an end-of-casing zone 16, often called shoe. This casing 15 is substantially seal-tight to the various fluids or liquids that can circulate in the borehole 11. The shoe 16 is situated at a depth $z_1$ from the surface of the ground 12.

Under the shoe 16, the well 10 is prolonged in a zone 10b, often called open-hole section, to the well bottom 11b. In this open-hole section, the borehole 11 passes through a geological formation 13 that is assumed to consist of a succession of N layers of materials denoted $C_1$, $C_2$, to $C_{N-1}$, then $C_N$. These layers of materials are generally rocks that are substantially homogeneous in their mineralogical composition, for the depths concerned, that is, greater than a few hundred metres, for example greater than 500 metres. The first layer $C_1$ is situated under the casing 15 and adjacent to the latter. The layer $C_N$ is situated close to the well bottom 11b. These layers of materials are represented as horizontal around the borehole 11, but they can of course be arranged otherwise.

Each layer $C_i$ is delimited by a top surface and a bottom surface. The bottom surface of a layer $C_i$ corresponds to the top surface of the next layer $C_{i+1}$.

In the execution of the method, the positions of the surfaces between the layers $C_1$-$C_N$ can have been determined by known subsoil imaging techniques, notably by seismic techniques implemented before the drilling of the well 10 or by diagraphic techniques implemented during the drilling of the well 10. These techniques make it possible to be informed of the geometry of the layers forming the subsoil. The method described here can then be used to obtain information on the hydraulic behaviour of the rocks or materials forming these layers. In particular, the method will provide estimations of different physical parameters of the materials forming the layers. The inventive method is adapted to a number N of layers that can range from 1 to several tens.

Each layer $C_i$ can be characterized by physical parameters such as permeability, porosity or a natural pressure. The present invention aims to determine at least one of these physical parameters. A skin effect in the vicinity of the borehole 11 can be taken into account, as described hereinbelow, in order to take account of a possible modification of certain properties of the rocks in the vicinity of the boring following operations conducted in the boring of the well 10.

The bottom surface of the last layer $C_N$ can be considered to be situated at the well bottom 11b, which is situated at a depth $z_2$ from the surface of the ground 12.

A tube 17 is positioned in the well 10 from the well head 11a substantially to the well bottom 11b. A cylindrical space 18 is defined inside the tube 17. An annular space 19 is defined between the wall of the well 10 and the tube 17.

The annular space 19 communicates at the well head 11a with a valve 24, a line 25 and a pump 26 with a tank 27 containing a fluid $L_1$. The fluid $L_1$ occupies the annular space 19 from the well head 11a to an interface level situated at a depth $z_i$ from the surface of the ground 12.

The fluid $L_1$ is for example a light liquid, for example a light hydrocarbon or soft water.

The cylindrical space 18 inside the tube 17 communicates at the well head 11a with a valve 20, a line 21 and a pump 22 with a tank 23 containing a fluid $L_2$. The fluid $L_2$ occupies the cylindrical space 18 from the well head 11a to the well bottom 11b, and the annular space 19 from the well bottom 11b to the interface level at the depth $z_i$.

The fluid $L_2$ is, for example, a heavy liquid, for example a mud.

The method will advantageously use two liquids $L_1$, $L_2$, without this being limiting.

At the depth $z_i$, an interface 34 separates the two liquids $L_1$, $L_2$. These liquids $L_1$, $L_2$ are advantageously non-miscible, so that there is a clear interface 34 between them.

At the well head 11a, a first pressure sensor 28 is linked by a line 29 and a valve 30 with the annular space 19 filled in the top part with the liquid $L_1$. The sensor 28 therefore makes it possible to measure, at the well head, the pressure $P_{ann}^{wh}$ in the annular space 19.

Similarly, a second pressure sensor 31 is linked by a line 32 and a valve 33 with the internal cylindrical space 18 filled with the liquid $L_2$. The sensor 31 therefore makes it possible to measure, at the well head, the pressure $P_{tub}^{wh}$ in the tube 17.

These two pressure sensors at the well head 11a form an example of instrumentation of the well 10 to obtain quantities measured in the well 10, but other possibilities can be envisaged.

For example, an alternative of the proposed instrumentation comprises:
- a first pressure sensor installed on the external surface of the tube 17 substantially facing the end-of-casing zone 16, that is, at the depth $z_1$,
- a second pressure sensor installed on the external surface of the tube 17 at the bottom end of the tube, that is, approximately at the depth $z_2$.

In this case, the two pressure sensors are therefore in the annular space 19 of the well 10, the first sensor measuring a pressure of the liquid $L_1$ and the second sensor measuring a pressure of the liquid $L_2$.

Another alternative of instrumentation of the well 10 comprises a position sensor of the interface level 34, or flow rate sensors in the annular space 19 and/or in the internal cylindrical space 18.

Hereinafter in this description, reference will be made to pressure sensors 28, 31 at the well head 11a, as represented in FIG. 1. It will be understood that any other instrumentation, and notably one of those described hereinabove, could be used to implement the inventive method.

Figure 2A:
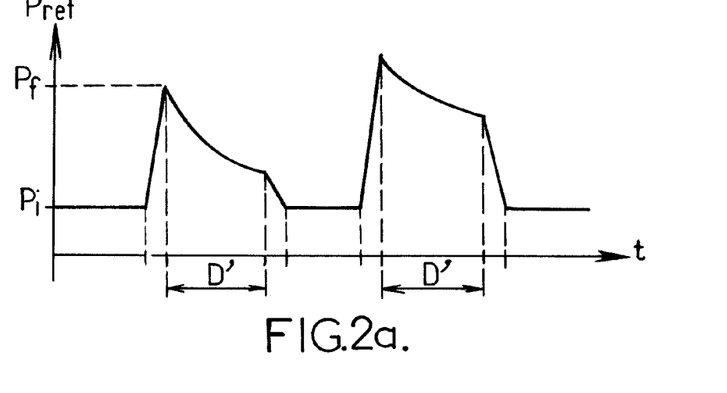
FIG. 2a shows a graph representing the trend of a pressure in the well as a function of time, during the execution of a first embodiment of the method.
Figure 2B:
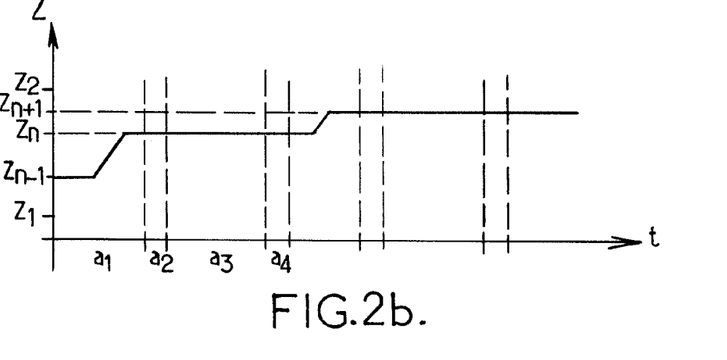
FIG. 2b shows a graph representing the trend of the depth of the interface in the well as a function of time, during the same execution of FIG. 2a of the method.

FIGS. 2a and 2b present, in an embodiment in which one of the pressures $P_{tub}^{wh}$ or $P_{ann}^{wh}$ is considered to be a reference pressure $P_{ref}$, the trends of this reference pressure $P_{ref}$ as a function of time, and of the depth $z_i$ of the interface 34, in correspondence.

This sequence comprises the successive steps (a1)-(a4), represented time-wise between the vertical broken lines of FIGS. 2a and 2b.

In the step (a1), the interface level 34 is displaced in the well 10 from a depth $z_{n-1}$ to a depth $z_n$ between $z_1$ and $z_2$.

This step (a1) is performed:
- either by injecting a displacement volume $V_d$ of the liquid $L_1$ via the pump 26, the line 25 and the valve 24 and simultaneously subtracting an identical volume of the liquid $L_2$ via the pump 22, the line 21 and the valve 20. In this first case, the interface 34 is displaced towards the well bottom 11b;
- or by subtracting a displacement volume $V_d$ of the liquid $L_1$ via the pump 26, the line 25 and the valve 24 and by simultaneously injecting an identical volume of the liquid $L_2$ via the pump 22, the line 21 and the valve 20. In this second case, the interface 34 is displaced towards the well head 11a.

The displacement volume $V_d$ can be determined using an average section $S_{ann}$ of the annular space 19.

The step (a1) is conducted with a reference pressure held at an initial value $P_i$ that is very low or zero, and can be controlled by the variation of the other pressure. The well is substantially in balance. There is therefore circulation of the liquids in the spaces 18-19.

In the step (a2), the hydraulic balance of the liquids in the well is disturbed by injecting or subtracting a volume $V_1$ of liquid, the reference pressure varying from the initial value $P_i$ to a final value $P_f$, as shown in FIG. 2a.

The volume $V_1$ is small in relation to the total volume of the well, of the order of a few litres, for example less than 100 litres, and this volume is injected in a short duration of the order of a few seconds, for example less than 60 seconds.

The step (a2) can consist in injecting or subtracting either a predetermined volume $V_1$ of liquid $L_1$ in the annular space 19 through the intermediary of the pump 26, the line 25 and the valve 24, or a predetermined volume $V_1$ of the liquid $L_2$ in the cylindrical space 18 through the intermediary of the pump 22, the line 21 and the valve 20.

Following this injection or removal, the pressure in the well 10 is modified and the hydraulic balance is disturbed. The liquids $L_1$, $L_2$ then begin to penetrate into or be extracted from the layers of the geological formation 13.

FIG. 2a shows the case of an injection. In this case, the pressure in the well increases during the step (a2).

In the step (a3), the variations of the pressures $P_{tub}^{wh}$ and $P_{ann}^{wh}$ are observed, for a duration D' while the liquids $L_1$, $L_2$ penetrate or are extracted from the layers of the geological formation 13.

The duration D' can be less than 1 hour, and sometimes less than 10 minutes. It is chosen according to the characteristics of the liquids $L_1$, $L_2$ and/or of the order of magnitude of the physical parameters of the layers $C_1$-$C_N$.

This duration D' can be different for each test sequence of the method. FIG. 2a shows two sequences: a first step (a3) of a duration D' and a second step (a3) of a duration D".

The pressures return towards the hydraulic balance of the liquids in the well 10.

In the case of FIG. 2a, these pressures diminish.

The variation of the pressures observed is representative of the characteristics of all of the layers of materials and of the history of the iterations of the measurement sequences. Consequently, these trends of the pressures are complex. The observation of a single iteration does not make it possible to obtain sufficiently accurately the physical parameters of one layer of materials in particular.

The depth $z_i$ of the interface 34 also changes during this step (a3), but since the volume $V_1$ is low, this change cannot be seen in FIG. 2b.

In the step (a4), the liquids of the well are returned to balance by removing or injecting a volume $V_2$ of liquid, contrary to the step (a2), the reference pressure $P_{ref}$ returning substantially to the initial value $P_i$.

Letting the system return naturally to balance following the disturbance of the step (a2) can take a long time, for example more than 1 hour, or even more than 4 hours. It is preferable to force this return to balance by the step (a4) of the method in order to shorten the duration D' of the step (a3).

Then, the sequence of the steps (a1) to (a4) is reiterated a certain number of times, two iterations being illustrated by FIG. 2a-b. This repetition of the sequence (a1)-(a4) makes it possible to acquire a large quantity of measurements that can then be analysed to estimate physical parameters of the layers $C_1$-$C_N$.

Advantageously, the interface 34 is positioned on each iteration at a depth $z_{n+1}$ that is different from the depths $z_n$ of the preceding iterations. In particular, by an appropriate choice of the displacement volumes $V_d$ in the successive steps (a1), it is possible to position the interface 34 at the level of a different layer $C_i$ on each iteration.

A mathematical model can be used to simulate, with a set of parameters, the hydraulic behaviour of the well 10, so as to produce calculated quantities, the dynamic trend of which can be reconciled with that of the measured quantities. In the example shown, the pressures $P_{ann}^{wh}$ and $P_{tub}^{wh}$ are calculated.

The mathematical model uses values that are assumed known, such as:
- characteristics of the liquids $L_1$, $L_2$ that are used, such as their densities $\rho_1$, $\rho_2$, their dynamic viscosities $\mu_1$, $\mu_2$, or their compressibility coefficients $\beta_1$, $\beta_2$,
- characteristics of the well 10, such as the depths $z_1$ and $z_2$, the average section $S_{ann}$ of the annular space 19 in line with the casing 15, the average section $\Sigma$ of the annular space 19 in the open-hole section 10b, an average section $S_{tub}$ of the internal cylindrical space 18.

Prior recordings, notably seismic or diagraphic recordings, can be used to know characteristics of the geological formation 13 in which the well 10 is bored beforehand, such as the depths and thicknesses of the different constituent layers of materials. This information is, however, optional. It is also possible to define in the mathematical model layers that have an arbitrary thickness, that may be very small, for example only 5 metres.

The mathematical model also uses unknown parameters, relating to each layer $C_i$ of materials, and in particular:
- a permeability $K^i$, and
- a porosity $\phi^i$.

Figure 3:
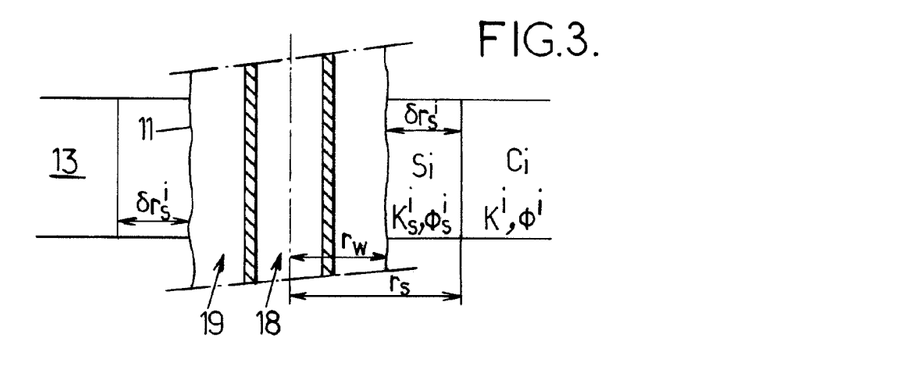
FIG. 3 is an enlarged cross-sectional view of a portion of the well of FIG. 1, showing a layer of materials, and parameters corresponding to a hydraulic mathematical model of said layer of materials.
Figure 4:
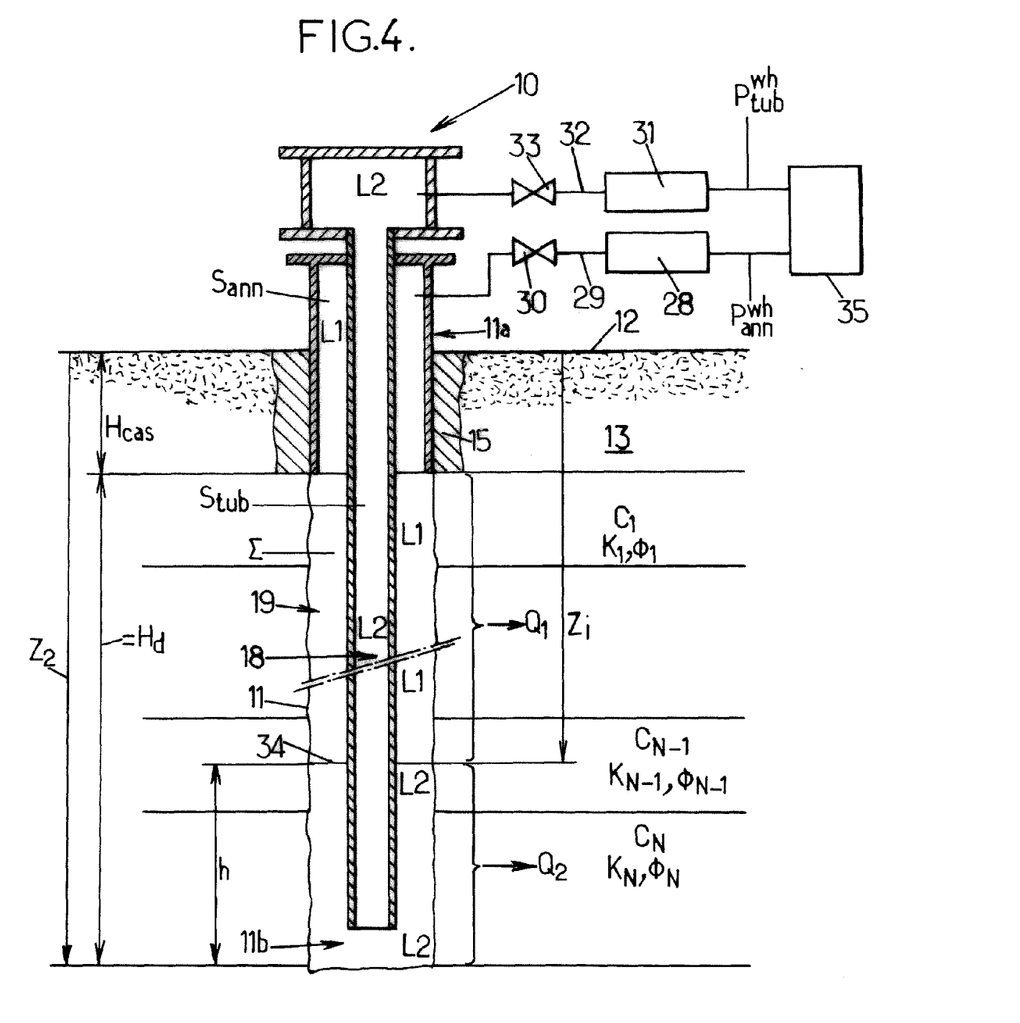
FIG. 4 is a cross-sectional view of a well similar to FIG. 1, showing other parameters of a hydraulic mathematical model of the well.

The permeability of the layers $C_i$ of materials of the geological formation 13 is often modified close to the wall of the borehole 11. The model can thus be complemented by using the concept of skin. Then, as represented in FIG. 3, the parameters of each layer $C_i$ of materials comprise, in addition to the permeability $K^i$ and the porosity $\phi^i$:
- a radial thickness $\delta r_s^i$ of skin,
- a permeability $K_s^i$ in the skin,
- a porosity $\phi_s^i$ in the skin.

As a variant, the skin can be modelled in a simplified manner by using a single parameter $\overline{S}^i$, called "skin", for each layer $C_i$ of materials, defined as follows:

$$\overline{S} = \left(\frac{K}{K_s}\right) \cdot \mathrm{Log}\!\left(\frac{r_s}{r_w}\right)$$

in which:
- K is the permeability beyond the skin,
- $K_s$ is the permeability in the skin,
- $r_w$ is the radius of the borehole 11,
- $r_s$ ($=r_w+\delta r_s^i$) is the external radius of the skin.

In a variant of the model, each layer $C_i$ of materials comprises a number M of radial zones of indices j, in the form of concentric rings, each radial zone having a radial thickness $\delta r_s^i$, a permeability $K_j^i$ and a porosity $\phi_j^i$. However, such a variant considerably increases the number of parameters to be determined.

In all cases, the mathematical model of the well 10 is based on the calculation at each instant t of two permeation flow rates $Q_1$, $Q_2$ of the liquids $L_1$, $L_2$ over the height of the open-hole section.

Following a variation of the pressure in the well after an injection or a removal of liquid at the well head 11a, the pressure returns towards its initial value corresponding to a state of balance in which the permeation flow rates $Q_1$, $Q_2$ are almost zero.

The two permeation flow rates are linked to the speeds of the variations of the pressures at the well head by the following matrix relation:

$$\begin{bmatrix} Q_1 \\ Q_2 \end{bmatrix} = \begin{bmatrix} C & -D \\ -E & F \end{bmatrix} \begin{bmatrix} \dot{P}_{tub}^{wh} \\ \dot{P}_{ann}^{wh} \end{bmatrix}$$

in which:

$$C = \frac{\Sigma \cdot A}{(\rho_2^d - \rho_1^d) \cdot g} + \frac{\rho_1^{ann}}{\rho_1^d} \cdot V_{ann} \cdot \beta_{ann}^{ext} + \Sigma \cdot (H_d - h) \cdot \beta_d^{ext}$$

$$D = \frac{\Sigma \cdot B}{(\rho_2^d - \rho_1^d) \cdot g} + \frac{\rho_1^{ann}}{\rho_1^d} \cdot V_{ann} \cdot (\beta_1 + \beta_{ann}^{int}) + \Sigma \cdot (H_d - h) \cdot (\beta_1 + \beta_d^{int})$$

$$E = \frac{\Sigma \cdot A}{(\rho_2^d - \rho_1^d) \cdot g} + \frac{\rho_2^{tub}}{\rho_2^d} \cdot V_{tub} \cdot (\beta_2 + \beta_{tub}^{int}) + \Sigma \cdot h \cdot (\beta_2 + \beta_d)$$

$$F = \frac{\Sigma \cdot B}{(\rho_2^d - \rho_1^d) \cdot g} + \frac{\rho_2^{tub}}{\rho_2^d} \cdot V_{tub} \cdot \beta_{tub}^{ext}$$

$$A = 1 + \beta_2 \cdot g \cdot (\rho_2^{tub} \cdot H_{tub} - \rho_2^d \cdot (h - H_{cas} - H_d - H_{tub}))$$

$$B = 1 + \beta_1 \cdot g \cdot (\rho_1^{ann} \cdot H_{cas} - \rho_1^d \cdot (H_d - h))$$

and:
- $\rho_1^d$ and $\rho_2^d$ are the respective densities of the liquids $L_1$ and $L_2$ at the depth of the open-hole section,
- g is the acceleration of gravity,
- $\rho_1^{ann}$ is the average density of the liquid $L_1$ in the annular space 19,
- $\rho_2^{tub}$ is the average density of the liquid $L_2$ in the tube 17,
- $V_{ann}$ is the volume of the annular space 19 from the top of the well 11a to the shoe 16,
- $V_{tub}$ is the internal volume of the tube 17 ($V_{tub} \approx S_{tub} \cdot H_{tub}$),
- $H_d$ is the height of the open-hole section 10b ($H_d \approx z_2 - z_1$),
- h is the height of the interface 34 relative to the well bottom 11b (h=$z_2-z_i$),
- $\Sigma$ is the average section of the annular space 19 at the level of the open-hole section 10b,
- $\beta_1$ and $\beta_2$ are the respective compressibility coefficients of the liquids $L_1$ and $L_2$,
- $\dot{P}_{tub}^{wh}$ and $\dot{P}_{ann}^{wh}$ are the speeds of variation of the pressure at the head of the tube 17 and of the annular space 19, respectively,
- $H_{cas}$ is the height of the casing 15 ($H_{cas} \approx z_1$),
- $H_{tub}$ is the height of the tube 17 ($H_{tub}=H_{cas}+H_d \approx z_2$),
- $\beta_{ann}^{int}$, $\beta_{ann}^{ext}$, $\beta_{tub}^{int}$, $\beta_{tub}^{ext}$, $\beta_d^{int}$, $\beta_d^{ext}$ and $\beta_d$ are compressibility coefficients.

The set of the latter compressibility coefficients is calculated by the elastic variations of the sections of the annular and internal space, according to the pressures, and can be expressed according to the elasticity parameters, Young's modulus E and Poisson's ratio v of the steel of the tube 17, of the cement of the casing 15 and of the rock of the geological formation 13.

$\beta_{ann}^{int}$, $\beta_{ann}^{ext}$ are compressibility coefficients associated with the annular space.

$\beta_{tub}^{int}$, $\beta_{tub}^{ext}$ are compressibility coefficients associated with the tube.

$\beta_d^{int}$, $\beta_d^{ext}$ are compressibility coefficients associated with the open-hole section above the interface.

$\beta_d$ is the compressibility coefficient associated with the open-hole section below the interface.

Taking into account these compressibility coefficients is important to obtain sufficient simulation accuracy, notably to obtain an accuracy less than 10%.

Real compressibility tests on the well 10 by filling it with a single viscous fluid that does not enter into the geological formation 13 can be used to perform measurements to verify the compressibility coefficient values calculated by the following analytical formulae, derived from the elastic variation calculations:

$$\beta_{ann}^{int} = \frac{2\pi}{S_{ann}} \left[ \lambda (r_{ann}^{int})^2 + \frac{(1+v_{tub})(r_{tub}^{ext})^2}{E_{tub}} \frac{[\tau_{tub}^2 - (1-2v_{tub})]}{(1-\tau_{tub}^2)} \right]$$

$$\beta_{ann}^{ext} = \frac{4\pi(1-v_{tub}^2)(r_{tub}^{ext})^2 \tau_{tub}^2}{S_{ann} E_{tub}(1-\tau_{tub}^2)}$$

$$\beta_{tub}^{int} = \frac{2(1+v_{tub})}{E_{tub}(1-\tau_{tub}^2)} [1+(1-2v_{tub})\tau_{tub}^2]$$

$$\beta_{tub}^{ext} = \frac{4(1-v_{tub}^2)}{E_{tub}}$$

$$\beta_d^{int} = \frac{\pi}{\Sigma} \left[ \frac{(1+v_R^d)(r_d)^2}{2E_R^d} + \frac{2(1+v_{tub})(r_{tub}^{ext})^2}{E_{tub}} \frac{[\tau_{tub}^2 - (1-2v_{tub})]}{(1-\tau_{tub}^2)} \right]$$

$$\beta_d^{ext} = \frac{4\pi(1-v_{tub}^2)(r_{tub}^{ext})^2 \tau_{tub}^2}{\Sigma E_{tub}(1-\tau_{tub}^2)}$$

$$\beta_d = \frac{2(1+v_R^d)}{E_R^d}$$

with $$\tau_{tub} = r_{tub}^{int}/r_{tub}^{ext}$$

$r_{tub}^{int}$ and $r_{tub}^{ext}$ are the internal and external radii of the tube 17, $r_{ann}^{int}$ is the internal radius of the casing 15, $r_d$ is the radius of the open-hole section 10b, $E_{tub}$ and $v_{tub}$ are the elastic parameters of the material of the tube 17, Young's modulus $E_{tub}$ and Poisson's ratio $v_{tub}$ of the tube 17, $E_R^d$ and $v_R^d$ are the elastic parameters of the material of the geological formation 13 at the level of the open-hole section 10b, Young's modules $E_R^d$ and Poisson's ratio $v_R^d$ of the open-hole section 10b.

$$\lambda = \frac{E_R^d a_{12} + (1+v_R^d)a_{22}}{E_R^d a_{11} + (1+v_R^d)a_{21}}$$

$a_{ij}$ being the components of the matrix product $[A_c] \cdot [A_1]$, the matrix $[A_c]$ making the link between the radial displacement and the radial stress in the cement around the casing 15, the matrix $[A_1]$ making the link between the radial displacement and the radial stress in the tube of the casing 15. The elastic relations in solid rings can be used to establish the following formula, which is valid for a ring of index j:

$$[A_j] = \begin{bmatrix} \frac{1-2v_j+\tau_j^2}{2(1-v_j)} & \frac{(1+v_j)(1-2v_j)(1-\tau_j^2)}{2E_j(1-v_j)} \\ \frac{(1-\tau_j^2)E_j}{2(1-v_j^2)} & \frac{1+(1-2v_j)\tau_j^2}{2(1-v_j)} \end{bmatrix}$$

with $\tau_j = r_j^{int}/r_j^{ext}$, $r_j^{int}$ and $r_j^{ext}$ are the internal and external radii of the ring concerned, $E_j$ and $v_j$ are the elastic parameters of the material of the ring concerned, Young's modulus $E_j$ and Poisson's ratio $v_j$ of said ring concerned.

It is then possible to calculate the speeds of variation of the pressures at the well head, $\dot{P}_{tub}^{wh}$ and $\dot{P}_{ann}^{wh}$, by inverting the preceding matrix equation. In other words:

$$\begin{bmatrix} \dot{P}_{tub}^{wh} \\ \dot{P}_{ann}^{wh} \end{bmatrix} = \frac{-1}{DE-CF} \begin{bmatrix} F & D \\ E & C \end{bmatrix} \begin{bmatrix} Q_1 \\ Q_2 \end{bmatrix} \quad (1)$$

The latter equation is used to calculate the trends of the pressures $P_{ann}^{wh}$ and $P_{tub}^{wh}$ at the well head 11a, as explained hereinbelow.

The speed of displacement of the height h of the interface 34 is then given by:

$$\dot{h} = \frac{1}{(\rho_2^d - \rho_1^d) \cdot g} \cdot [A-B] \begin{bmatrix} \dot{P}_{tub}^{wh} \\ \dot{P}_{ann}^{wh} \end{bmatrix} = \frac{-1}{\kappa \cdot (\rho_2^d - \rho_1^d) \cdot g} \cdot [\xi \ \theta] \begin{bmatrix} Q_1 \\ Q_2 \end{bmatrix} \quad (2)$$

with: $\kappa = DE-CF$, $\xi = AF-BE$ and $\theta = AD-BC$

Furthermore, a permeation flow rate per unit of height function can be calculated using a layer i hydraulic diffusion equation, similar to a so-called Fourier thermal diffusion equation that is well known. This hydraulic diffusion equation is expressed:

$$\frac{\partial \psi^{hyd}}{\partial t} = k_R^{hyd} \cdot \nabla^2 \psi^{hyd}$$

in which: $\Psi^{hyd}$ is the hydraulic potential, that is $\Psi^{hyd} = P - \rho g z$, P being the pressure at a reference level (here, the level of the surface where the pressures $P_{ann}^{wh}$ and $P_{tub}^{wh}$ are measured), $\rho$ is the average density of the liquid concerned and z is the depth relative to the reference level, g is the acceleration of gravity, $\nabla^2$ designates the laplacian, $k_R^{hyd}$ is the hydraulic diffusivity of the medium, that is $k_R^{hyd} = K_R^{hyd} \cdot M/\mu_f$, $K_R^{hyd}$ is the permeability of the material, M is the Biot's modulus of the material, $\mu_f$ is the dynamic viscosity of the liquid f diffusing in the material.

This hydraulic diffusion equation accepts, in the case of a layer of isotropic material in a horizontal plane around a well 10 of diameter $2r_w$, modelled as polar coordinates, a solution that can be expressed by the following flow rate per unit of height function:

$$\Phi^{hyd} = \frac{2\pi \cdot r_w \cdot K_R^{hyd}}{\mu_f} \cdot \left( \frac{\partial \psi^{hyd}}{\partial r} \right)_{r=r_w} \quad (3)$$

or $$\Phi^{hyd} = \frac{2\pi \cdot K_R^{hyd} \cdot \psi_0^{hyd}}{\mu_f} \cdot f(\tau^{hyd})$$

with $$f(\tau) = \frac{4}{\pi} \int_0^\infty \frac{e^{-ku^2\tau}}{u[J_0^2(u \cdot r_w) + Y_0^2(u \cdot r_w)]} du$$

$$\psi_0^{hyd} = P_0 - P^\infty,$$

$P^\infty$: pore pressure at infinite distance, that is, the natural pressure far from the boring of the well 10.

$P_0$: constant hydraulic pressure in the well 10, $J_0$ and $Y_0$: first and second order Bessel functions, $$\tau^{hyd} = \frac{k_R^{hyd} \cdot t}{r_w^2} = \frac{K_R^{hyd} \cdot t}{\lambda_f}, \text{ with } \lambda_f = \frac{\mu_f \cdot r_w^2}{M} \approx \mu_f \cdot \beta_f \cdot r_w^2 \cdot \phi$$

The permeation flow rates $Q_1$, $Q_2$ can then be calculated by integrating over the desired height the flow rate per unit of height function, using for each section or layer the appropriate parameters of the liquids and of the materials.

Thus, with the equations (1), (2) and (3), it is possible to calculate the variations of the pressures $P_{ann}^{wh}$ and $P_{tub}^{wh}$ at the well head 11a, and the trend of the height h of the interface 34.

This calculation is performed time-wise step by step, from the initial instant of the disturbance, by dividing up the time t into small time slots δt for which a small pressure variation is calculated. It takes account of the trend of the depth $z_i$ of the interface 34 and of the volumes of the two liquids $L_1$, $L_2$ entering or leaving in the various layers of materials of the geological formation 13.

The permeations flow rate $Q_1^{n+1}$ of the first liquid $L_1$ at the $(n+1)^{th}$ iteration of the calculation is then expressed by:

$$Q_1^{n+1}(t) = \frac{2\pi}{\mu_1} \cdot \sum_{i=0}^{n} \left[ \Delta P_{ann}^i \cdot \int_{H_{cas}}^{H_{cas}+H_d-h_i} K_R^{hyd}(z) \cdot f\left(\frac{K_R^{hyd}(z) \cdot [t - i \cdot \delta t]}{\lambda_1(z)}\right) \cdot dz \right]$$

with $$\lambda_1(z) = \frac{\mu_1 \cdot r_d^2}{M(z)} \approx \mu_1 \cdot \beta_1 \cdot r_d^2 \cdot \phi(z)$$

$h_i$: height, relative to the well bottom, of the interface 34 during the $(n+1)^{th}$ time slot of the calculation, $\Delta P_{ann}^i$: variation of the pressure at the top of the annular space 19 during the $i^{th}$ time slot of the calculation ($\Delta P_{ann}^i = \dot{P}_{ann}^{wh} \cdot \delta t$).

This permeation flow rate $Q_1^{n+1}$ at the $(n+1)^{th}$ iteration of the calculation results from the integral over the height of the annular space 19 filled with the liquid $L_1$, that is, between $H_{cas}$ and $H_{cas}+H_d-h$, of a flow rate per unit of height function, and of the sum of the flow rates of the preceding instants, for i=0 to n. It reveals the permeability $K_R^{hyd}(z)=K^i$ of the material at the depth z concerned and its porosity $\phi(z)$.

The volume of the liquid $L_1$ migrating into the geological formation during the $(n+1)^{th}$ time slot of the calculation is expressed by:

$$v_1^{n+1} = \int_{n \cdot \delta t}^{(n+1) \cdot \delta t} Q_1^{n+1}(t) \cdot dt$$

The permeation flow rate $Q_2^{n+1}$ of the liquid $L_2$ at the $(n+1)^{th}$ iteration of the calculation is expressed in a similar manner by:

$$Q_2^{n+1}(t) = \frac{2\pi}{\mu_2} \cdot \sum_{i=0}^{n} \left[ \Delta P_{tub}^i \cdot \int_{H_{cas}+H_d-h_i}^{H_{cas}+H_d} K_R^{hyd}(z) \cdot f\left(\frac{K_R^{hyd}(z) \cdot [t - i \cdot \delta t]}{\lambda_2(z)}\right) \cdot dz \right]$$

with $$\lambda_2(z) = \frac{\mu_2 \cdot r_d^2}{M(z)} \approx \mu_2 \cdot \beta_2 \cdot r_d^2 \cdot \phi(z)$$

$\Delta P_{tub}^i$: variation of the pressure at the top of the cylindrical space during the $i^{th}$ time slot of the calculation ($\Delta P_{tub}^i = \dot{P}_{tub}^{wh} \cdot \delta t$).

The volume of the liquid $L_2$ migrating into the geological formation during the $(n+1)^{th}$ time slot of the calculation is expressed by:

$$v_2^{n+1} = \int_{n \cdot \delta t}^{(n+1) \cdot \delta t} Q_2^{n+1}(t) \cdot dt$$

The variations of the pressures $P_{ann}^{wh}$ and $P_{tub}^{wh}$ during the $(n+1)^{th}$ time slot of the calculation are then given by a discretized version of (1), in which the components C, D, E, F of the matrix are expressed as a function of the height $h_n$ of the interface on completion of the $n^{th}$ iteration of the calculation:

$$\begin{bmatrix} \Delta P_{tub}^{n+1} \\ \Delta P_{ann}^{n+1} \end{bmatrix} = \frac{-1}{\kappa(h_n)} \cdot \begin{bmatrix} F(h_n) & D(h_n) \\ E(h_n) & C(h_n) \end{bmatrix} \begin{bmatrix} v_1^{n+1} \\ v_2^{n+1} \end{bmatrix}$$

The variation of the height h of the interface 34 relative to the well bottom during the $(n+1)^{th}$ time slot of the calculation is deduced from (2):

$$\Delta h_{n+1} = h_{n+1} - h_n = \frac{-1}{\kappa(h_n) \cdot (\rho_2^d - \rho_1^d) \cdot g} [\xi(h_n) \quad \theta(h_n)] \cdot \begin{bmatrix} v_1^{n+1} \\ v_2^{n+1} \end{bmatrix}$$

These calculations are performed by taking for the initial instant $\Delta P_{ann}^0 \approx \Delta P_{tub}^0$ equal to the pressure variation measured at the moment of the disturbance (height of the peak in FIG. 2a), and $h_0$ is the height of the interface 34.

The preceding formulae show that the calculation is strongly coupled between the pressure variations, the height h variations of the interface, and the volumes of the liquids $L_1$, $L_2$ penetrating at each instant t into the various layers $C_i$ of materials of the geological formation 13.

A cost function $f_c$, or objective function, is defined to evaluate the differences between the quantities calculated using the mathematical model and the same quantities that have been measured. This cost function is, for example, the sum of the moduli of the differences between the calculated and measured quantities, or even the sum of the squares of these differences. The duly compared quantities are typically the pressures $P_{ann}^{wh}$, $P_{tub}^{wh}$ measured at the well head 11a by the sensors 28 and 31.

A minimization or inversion algorithm can be used to search for parameter values that minimize the cost function.

The cost function $f_c$ presents for several sets of parameters a local minimum. To resolve the inverse problem, an algorithm of the "Nelder-Mead" type (Simplex), or of the genetic type or of the neural network type or of the particle swarm type, can advantageously be used.

The minimization algorithm varies each parameter of the model within a variation range so as to minimize the cost function $f_c$. For example:

the variation range of the permeabilities can be between $10^{-19}$ and $10^{-15}$ m$^2$, the variation range of the porosities $\phi^i$ can be between 0.01 and 20%, the variation range of the skin $\overline{S}^i$ can be between 0 and 50, in the case of a simplified skin model.

Figure 5A:
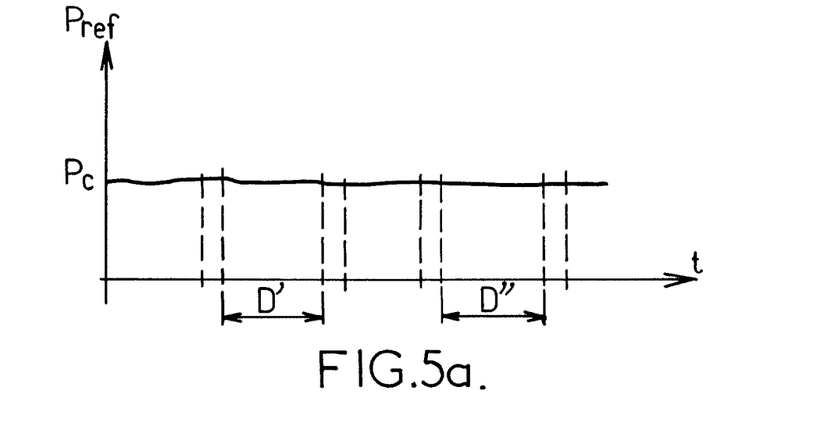
FIG. 5a shows a graph representing the trend of a pressure in the well as a function of time, during the execution of a second embodiment of the method.
Figure 5B:
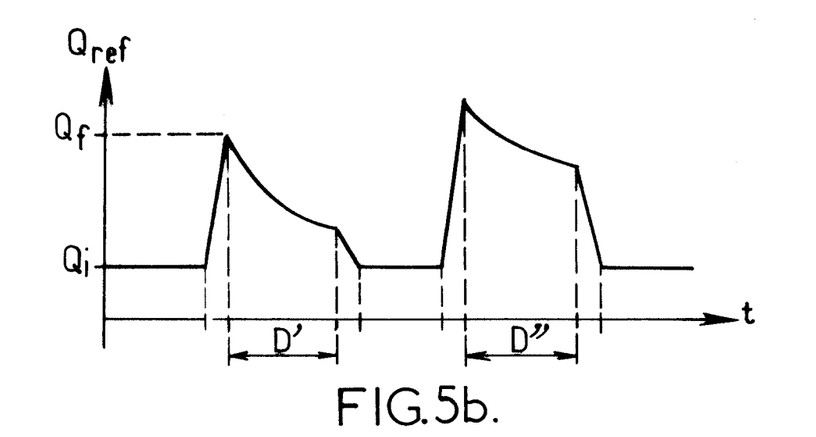
FIG. 5b shows a graph representing the trend of a supply flow rate of the well as a function of time, during the same execution of FIG. 5a of the method.
Figure 5C:
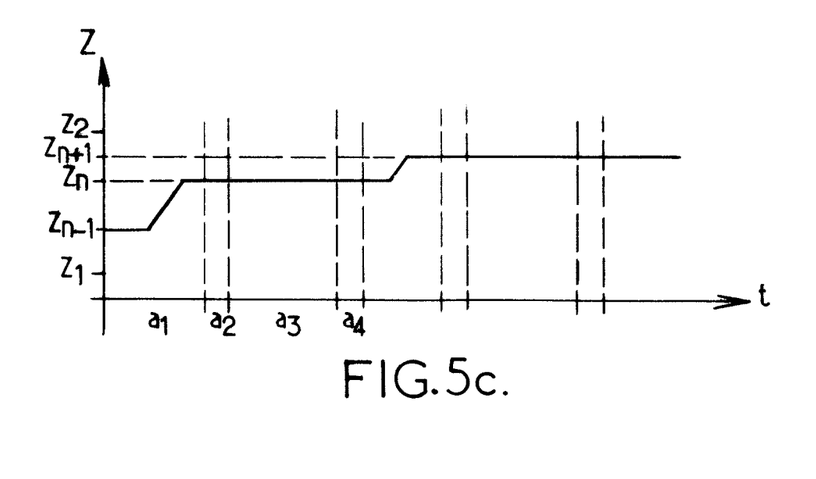
FIG. 5c shows a graph representing the trend of the depth of the interface in the well as a function of time, during the same execution of FIG. 5a of the method. In the different figures, the same references designate identical or similar elements.

FIGS. 5a to 5c present a second embodiment of the method, in which the well is equipped with a system of servo-controlling a reference pressure $P_{ref}$, so that said reference pressure is held substantially constant at a value $P_c$ as represented in FIG. 5a.

The lines 21, 25 are then, for example, each equipped with a flow rate measuring device to measure at each instant the flow rates and/or volumes of the fluids injected and removed at the well head.

The servo-control or closed-loop control system then controls the pumps 22, 26 to automatically inject or remove a certain quantity of fluid to keep said reference pressure $P_{ref}$ constant.

Well head flow rates $Q_{ann}^{wh}$ and $Q_{tub}^{wh}$ are measured during the tests, FIG. 5b showing an example of the trend of a reference flow rate $Q_{ref}$ during a test sequence similar to that of the first embodiment of the method represented by FIGS. 2a and 2b. These flow rates can be used to estimate the permeation flow rates $Q_1$ and $Q_2$ of the liquid $L_1$ and $L_2$, respectively, in a manner similar to the calculations presented previously for the well head pressures.

FIG. 5c then represents in this embodiment the trends of the depth $z_i$ of the interface 34 during said test sequence.

The calculated variations of pressures and/or flow rates at the well head can then also be calculated.

The comparison of the trends of the measured and simulated quantities can therefore be performed equally on pressures or flow rates, to identify an optimum set of values for the physical parameters of the geological formation 13.

Also, the methods described implement disturbance sequences of the hydraulic balance of the well 10 at interface depths that are predetermined and substantially constant during each sequence. The method can, however, also be implemented if these disturbance sequences of the hydraulic balance of the well 10 are performed simultaneously with a continuous displacement of the interface 34 between two depths of the interface. The interface 34 can notably be displaced any number of times between two depths. These scanning sequences of the interface 34 towards the well bottom 11b, then towards the shoe 16 themselves each constitute at least one disturbance of the hydraulic balance of the well 10. The measured trends of the quantities relating to properties of the fluids compared to the trends of the same quantities simulated then make it possible to identify an optimum set of values for the physical parameters of the geological formation.

The preceding description describes embodiments of the method with a single interface 34 between two liquids, but two or a plurality of interfaces between liquids can be used to implement the method.

Similarly, any liquid or gaseous fluid can also be used instead of one of the liquids of this description.

The invention claimed is:

1. Method of estimating physical parameters of a geological formation having a plurality of layers, comprising the following steps:

equipping a well passing through the geological formation with a tube open at its bottom end;

filling the tube and a bottom part of an annular space situated around the tube in the well with a first fluid;

filling the rest of the annular space with at least one second fluid so that the fluids exhibit an interface in the annular space;

disturbing a hydraulic balance of the fluids in the well;

measuring the trend of quantities relating to properties of the fluids in the well based on all of the plurality of layers in contact with the first and second fluids;

performing computer simulations of the hydraulic behaviour of the fluids having a disturbed balance in the well, each simulation using a model taking into account the plurality of layers, calculating a permeation flow rate of the first fluid into the layers of the plurality of layers in contact with the first fluid, calculating a permeation flow rate of the second fluid into the layers of the plurality of layers in contact with the second fluid, and using a set of values for said physical parameters of the plurality of layers of the geological formation and giving rise to a simulated trend of said quantities; and comparing the measured and simulated trends of said quantities to identify an optimum set of values for said physical parameters of the plurality of layers of the geological formation.

2. Method according to claim 1, wherein said interface is successively positioned at different depths by adjusting the amount of the first and second fluids in the well, and, for each depth, the balance of the fluids is disturbed and the trend of the quantities is measured.

3. Method according to claim 1, wherein said interface is displaced between at least two depths by adjusting the amount of the first and second fluids in the well, and, while the interface is being displaced, the balance of the fluids is disturbed and the trend of the quantities is measured.

4. Method according to claim 1, wherein the hydraulic balance of the well is disturbed by injecting or subtracting a predetermined volume of fluid in the tube and/or in the annular space.

5. Method according to claim 1, wherein each simulation comprises an estimation of the permeation flow rates of the fluids towards the geological formation, then an estimation of the simulated trend of said quantities relating to properties of the fluids in the well.

6. Method according to claim 5, wherein each simulation also comprises an estimation of the depth of said interface in the annular space based on estimated permeation flow rates.

7. Method according to claim 1, wherein the first and second fluids are liquids.

8. Method according to claim 1, wherein said physical parameters comprise at least one parameter out of the permeability and the porosity of at least one layer of materials of the geological formation.

9. Method according to claim 1, wherein said physical parameters comprise the natural pressure of at least one layer of materials of the geological formation.

10. Method according to claim 1, wherein the first fluid is denser than the second fluid.

11. Method according to claim 1, wherein said quantities relating to properties of the fluids in the well comprise the depth of said interface along the annular space.

12. Method according to claim 1, wherein said quantities relating to properties of the fluids in the well comprise a flow rate of injection or removal of fluid at the well head.

13. Method according to claim 1, wherein the well is also fitted with a servo-control for one of the quantities relating to fluid properties.

14. Method according to claim 1, wherein the measurement sequences are executed in succession, each measurement sequence comprising:
   positioning said interface at a determined depth for said sequence by adjusting the amount of the first and second fluids in the well;
   disturbing a hydraulic balance of the fluids in the well by injecting or subtracting a predetermined volume of fluid in the tube and/or in the annular space.

15. Method according to claim 1, wherein said quantities relating to properties of the fluids in the well comprise a pressure inside the tube, and a pressure in the annular space.

16. Method according to claim 15, wherein said pressures are measured at the well head.

17. Method according to claim 16, wherein one of said pressures is considered to be a reference pressure, and wherein each measurement sequence comprises at least the following steps:
   (a1) displacing the interface in the well to a predetermined position,
   (a2) disturbing a balance of the fluids of the well by injecting a first volume of fluid, the reference pressure varying from an initial pressure value to a final pressure value,
   (a3) observing the variations of said pressures, and
   (a4) returning the fluids of the well to balance by subtracting a second volume of fluid, the reference pressure varying to roughly the initial pressure value.

18. Method according to claim 17, wherein, in the step (a1), said interface is positioned at a depth that is different from one measurement sequence to another.

19. Method according to claim 18, wherein the geological formation comprises several layers passed through by the well, and wherein, in the step (a1), said interface is positioned facing a different layer of materials from one measurement sequence to another.

20. Method according to claim 1, wherein one of said pressures is considered to be a reference pressure, and wherein each measurement sequence comprises at least the following steps:
   (a1) displacing the interface in the well to a predetermined position,
   (a2) disturbing a balance of the fluids of the well by injecting a first volume of fluid, the reference pressure varying from an initial pressure value to a final pressure value,
   (a3) observing the variations of said pressures, and
   (a4) returning the fluids of the well to balance by subtracting a second volume of fluid, the reference pressure varying to roughly the initial pressure value.

21. Method according to claim 20, wherein, in the step (a1), said interface is positioned at a depth that is different from one measurement sequence to another.

22. Method according to claim 18, wherein the geological formation comprises several layers passed through by the well, and wherein, in the step (a1), said interface is positioned facing a different layer of materials from one measurement sequence to another.

* * * * *